US009558348B1

(12) United States Patent
Muttik

(10) Patent No.: US 9,558,348 B1
(45) Date of Patent: Jan. 31, 2017

(54) RANKING SOFTWARE APPLICATIONS BY COMBINING REPUTATION AND CODE SIMILARITY

(75) Inventor: Igor Muttik, Berkhamsted (GB)

(73) Assignee: McAfee, Inc., Santa Clara, CA (US)

( * ) Notice: Subject to any disclaimer, the term of this patent is extended or adjusted under 35 U.S.C. 154(b) by 81 days.

(21) Appl. No.: 13/409,741

(22) Filed: Mar. 1, 2012

(51) Int. Cl.
 *G06F 21/51* (2013.01)
 *G06F 21/56* (2013.01)

(52) U.S. Cl.
 CPC ............. *G06F 21/51* (2013.01); *G06F 21/56* (2013.01)

(58) Field of Classification Search
 CPC ........ H04L 63/20; G06F 21/53; G06F 21/567; G06F 21/51; G06F 21/56
 USPC .......................................................... 726/23
 See application file for complete search history.

(56) References Cited

U.S. PATENT DOCUMENTS

| 7,730,539 B2* | 6/2010 | Murphy et al. ................. 726/25 |
| 7,849,502 B1* | 12/2010 | Bloch et al. .................... 726/11 |
| 7,908,658 B1* | 3/2011 | Oeij ................................ 726/24 |
| 8,112,412 B1* | 2/2012 | Nachenberg ................. 707/710 |
| 8,205,217 B2* | 6/2012 | Kennedy et al. ............. 719/327 |
| 8,312,537 B1* | 11/2012 | Nachenberg et al. ......... 726/22 |
| 8,312,539 B1* | 11/2012 | Nachenberg et al. ......... 726/22 |
| 8,321,940 B1* | 11/2012 | Pereira et al. ................. 726/23 |
| 8,336,100 B1* | 12/2012 | Glick et al. .................... 726/23 |
| 2002/0026396 A1* | 2/2002 | Dent ...................... G06Q 40/00 705/35 |
| 2003/0046223 A1* | 3/2003 | Crawford ............. G06Q 20/10 705/38 |
| 2005/0204002 A1* | 9/2005 | Friend ................... G06Q 30/00 709/206 |
| 2006/0212931 A1* | 9/2006 | Shull et al. ...................... 726/10 |
| 2006/0253580 A1* | 11/2006 | Dixon et al. .................. 709/225 |
| 2007/0240217 A1* | 10/2007 | Tuvell et al. ................... 726/24 |
| 2008/0005223 A1* | 1/2008 | Flake et al. ................... 709/203 |
| 2008/0175266 A1* | 7/2008 | Alperovitch et al. ........ 370/465 |
| 2009/0083731 A1* | 3/2009 | Sobel .............................. 717/177 |
| 2009/0234663 A1* | 9/2009 | McCann ............ G06Q 30/0281 705/346 |
| 2009/0276433 A1* | 11/2009 | Fosback et al. ................. 707/9 |
| 2010/0011415 A1* | 1/2010 | Cortes et al. ..................... 726/4 |
| 2010/0058317 A1* | 3/2010 | Braams ........................ 717/171 |
| 2010/0058468 A1* | 3/2010 | Green et al. .................... 726/22 |

(Continued)

OTHER PUBLICATIONS

Appthority named finalist for "most innovative company at RSA(R) conference 2012". (Feb. 23, 2012). Business Wire. Retrieved from http://search.proquest.com/docview/923045673?accountid=14753.*

(Continued)

*Primary Examiner* — Jason Liao
(74) *Attorney, Agent, or Firm* — Blank Rome, LLP

(57) ABSTRACT

Disclosed are systems and methods to combine a reputation score for a software application publisher or vendor and code analysis techniques to provide a method of ranking software applications. A user downloading a software application may be confident that the software application is reliable and does not contain malicious content based on the ranking applied to the particular software application. Code analysis techniques allow for an application ranking even when there may not be enough historical information about the publisher/vendor to create a solid reputation score. A software application rank may be used internally to a software application store prior to making the software application available to the public.

19 Claims, 7 Drawing Sheets

(56) References Cited

U.S. PATENT DOCUMENTS

| | | | |
|---|---|---|---|
| 2010/0077445 A1* | 3/2010 | Schneider et al. | 726/1 |
| 2010/0186088 A1* | 7/2010 | Banerjee et al. | 726/23 |
| 2011/0010759 A1* | 1/2011 | Adler | 726/4 |
| 2011/0162070 A1* | 6/2011 | Krasser et al. | 726/23 |
| 2013/0073672 A1* | 3/2013 | Ayed | 709/217 |
| 2013/0097659 A1* | 4/2013 | Das et al. | 726/1 |
| 2013/0097706 A1* | 4/2013 | Titonis et al. | 726/24 |
| 2013/0111547 A1* | 5/2013 | Kraemer | 726/1 |
| 2013/0191918 A1* | 7/2013 | Nachenberg | 726/24 |
| 2013/0227636 A1* | 8/2013 | Bettini et al. | 726/1 |
| 2013/0263260 A1* | 10/2013 | Mahaffey et al. | 726/22 |

OTHER PUBLICATIONS

Appthority and appcelerator unveil secure enterprise app development solution. (Feb. 29, 2012). Business Wire. Retrieved from http://search.proquest.com/docview/923975759?accountid=14753.*

Appthority and BoxTone partner to deliver mobile app risk management. (Feb. 28, 2012). Business Wire. Retrieved from http://search.proquest.com/docview/923744299?accountid=14753.*

Company profile for appthority. (Feb. 24, 2012). Business Wire. Retrieved from http://search.proquest.com/docview/926350382?accountid=14753.*

* cited by examiner

RANKING SOFTWARE APPLICATIONS BY COMBINING REPUTATION AND CODE SIMILARITY

BACKGROUND

This disclosure relates generally to a system and method for providing a "ranking" for software applications. More particularly, but not by way of limitation, this disclosure relates to systems and methods to determine a ranking score for a software application by combining a reputation (if available) of the software author (or authoring corporation) with a code analysis to determine code similarity to known good or bad software applications. Potential software downloaders may then use the determined ranking (e.g., augmented reputation) to determine if the software application should be considered "untrustworthy" or given an implicit higher level of trust.

Internet exchange of information is common place today. One method of exchanging information is by retrieving an application from an Internet download source (referred to herein as software application store). A user retrieving an application would like to be confident that the software application is reliable and does not contain malicious content. When a new application is posted to a software application store it is difficult to assign it a software ranking (e.g., level of trust) because little is known about the new application. A standard way of providing a ranking of a software application is to receive feedback from people that have downloaded and utilized the application. However, if the software application contains malicious code the first downloaders will likely suffer the ill effects before they can prevent others from downloading the same application. Obviously, it will take some number of initial users to provide negative feedback and thus create a negative software reputation.

Another method of rating software utilizes "reputation" of sellers of the application (i.e., person or vendor posting the application to the software application store). Reputation is generally used as a method to label trustworthy sellers which could provide good results only when there is enough historical information about the seller. Reputation of a seller can be generated using many different techniques that alter a reputation up (i.e., better reputation) when a seller receives good feedback and alter the reputation down (i.e., worse reputation) when a seller receives negative feedback. However, a new user (or new software vendor) that has no historical information will by default be assigned a neutral reputation and a software application published by them will not necessarily appear "trustworthy."

To address these and other problems users encounter with downloadable content, systems and methods are disclosed to utilize a Reputation Service "RS" which can provide a score for application sellers in conjunction with code similarity analysis to determine an aggregate score for individual applications. Given this score, other users and user devices can receive an indication of an "untrustworthy" application prior to downloading the application (i.e., a software application ranking). Actions devices can take based on these types of indications, and other improvements for ranking software applications using reputation and code similarity analysis are described in the Detailed Description section below.

DETAILED DESCRIPTION

Various embodiments, described in more detail below, provide a technique for determining a software application ranking using a combination of reputation score and code analysis techniques. The implementation could utilize a "cloud" of resources for centralized analysis. Individual users and systems interacting with the cloud need not be concerned with the internal structure of resources in the cloud and can participate in a coordinated manner to ascertain potential "untrustworthy" and "trustworthy" software applications available on one or more software applications stores on the Internet. For simplicity and clearness of disclosure, embodiments are disclosed primarily for a software application for a smart phone. However, a ranking could similarly be measured and provide input to ranking a computer application or other download which might contain malicious content. In each of these illustrative cases, users can be protected from or informed about content that may be untrustworthy. Alternatively, "trustworthy" users can benefit from a good reputation earned over time based on their reliable Internet activities.

As explained above, disclosed methods of ranking a software application utilize a reputation score accumulated over time if it is available. Many different methods of providing a reputation score can be envisioned. One specific technique is described in co-owned U.S. patent application Ser. No. 13/294,417 entitled, "Reputation Services for a Social Media Identity," filed 11 Nov. 2011, by Simon Hunt et al. which is incorporated by reference herein in its entirety.

Figure 1:
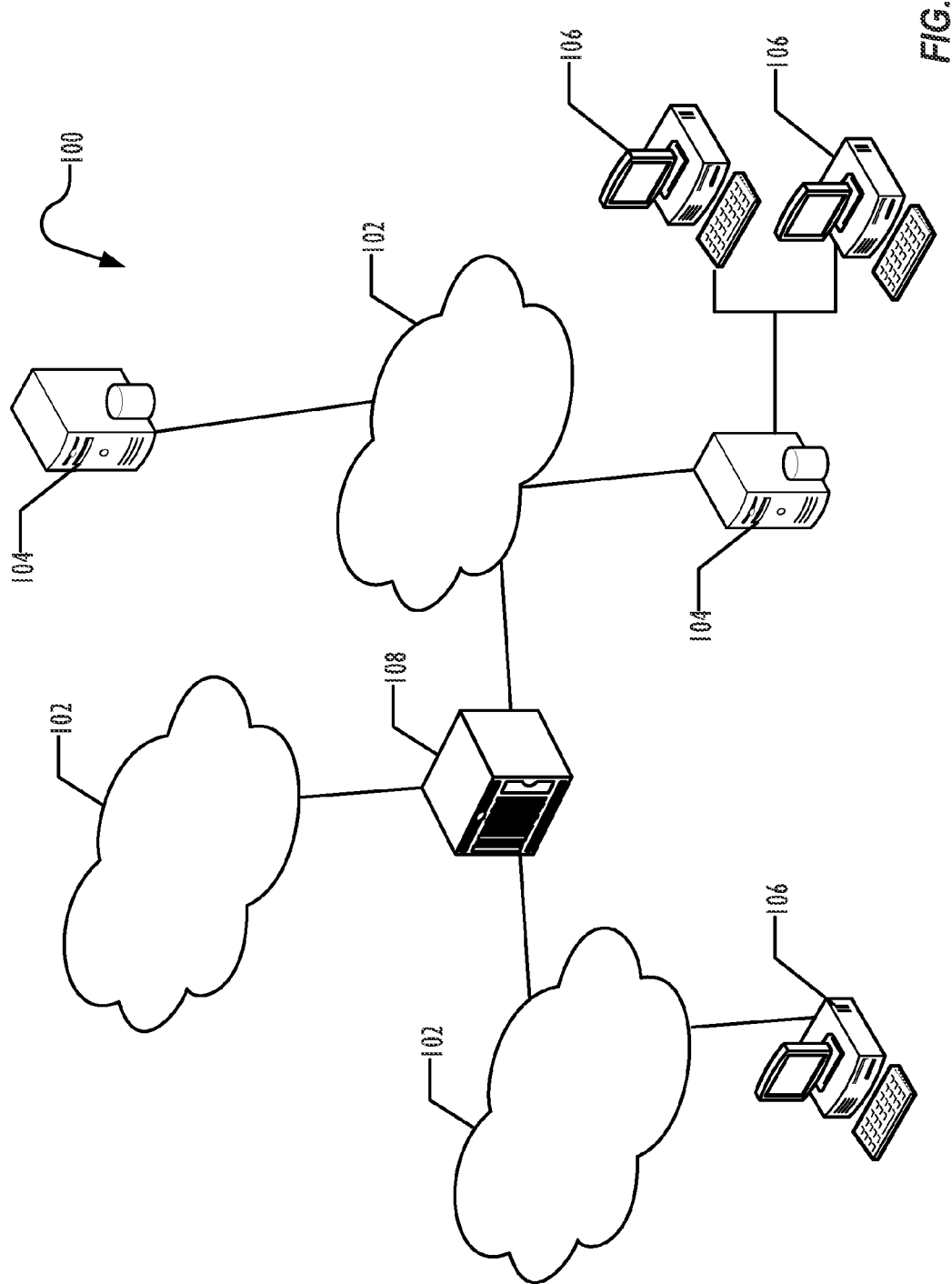
FIG. 1 is a block diagram illustrating network architecture 100 according to one embodiment.

FIG. 1 illustrates network architecture 100 in accordance with one embodiment. As shown, a plurality of networks 102 is provided. In the context of the present network architecture 100, networks 102 may each take any form including, but not limited to, a local area network (LAN), a wireless network, a wide area network (WAN) such as the Internet, etc.

Coupled to networks 102 are data server computers 104 which are capable of communicating over networks 102. Also coupled to networks 102 and data server computers 104 is a plurality of end user computers 106. Such data server computers 104 and/or client computers 106 may each include a desktop computer, lap-top computer, hand-held computer, mobile phone, peripheral (e.g. printer, etc.), any component of a computer, and/or any other type of logic. In order to facilitate communication among networks 102, at least one gateway or router 108 is optionally coupled there between.

Figure 2:
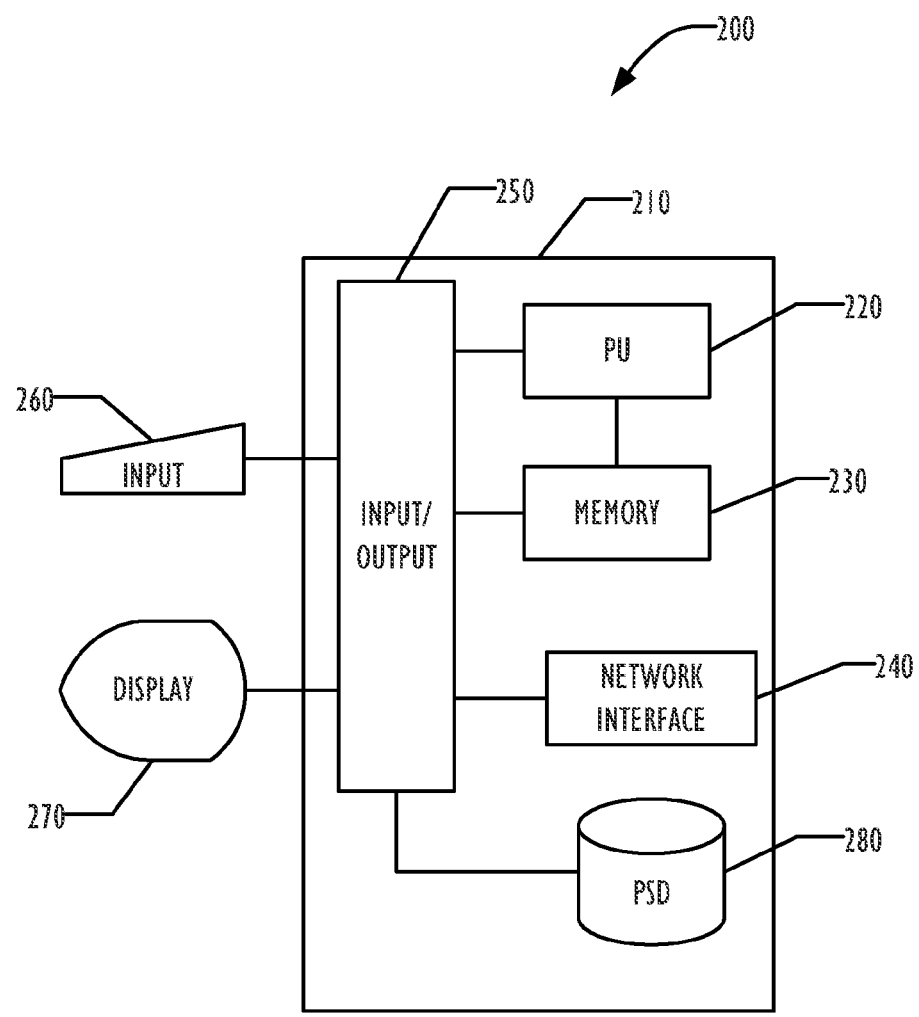
FIG. 2 is a block diagram illustrating a computer on which software to determine an application ranking according to one embodiment may be installed.

Referring now to FIG. 2, an example processing device 200 for use in providing a software application ranking according to one embodiment is illustrated in block diagram form. Processing device 200 may serve as a gateway or router 108, client computer 106, or a server computer 104. Example processing device 200 comprises a system unit 210 which may be optionally connected to an input device for system 260 (e.g., keyboard, mouse, touch screen, etc.) and display 270. A program storage device (PSD) 280 (sometimes referred to as a hard disc or computer readable medium) is included with the system unit 210. Also included with system unit 210 is a network interface 240 for communication via a network with other computing and corporate infrastructure devices (not shown). Network interface 240 may be included within system unit 210 or be external to system unit 210. In either case, system unit 210 will be communicatively coupled to network interface 240. Program storage device 280 represents any form of non-volatile storage including, but not limited to, all forms of optical and magnetic memory, including solid-state, storage elements, including removable media, and may be included within system unit 210 or be external to system unit 210. Program storage device 280 may be used for storage of software to control system unit 210, data for use by the processing device 200, or both.

Figure 5A:
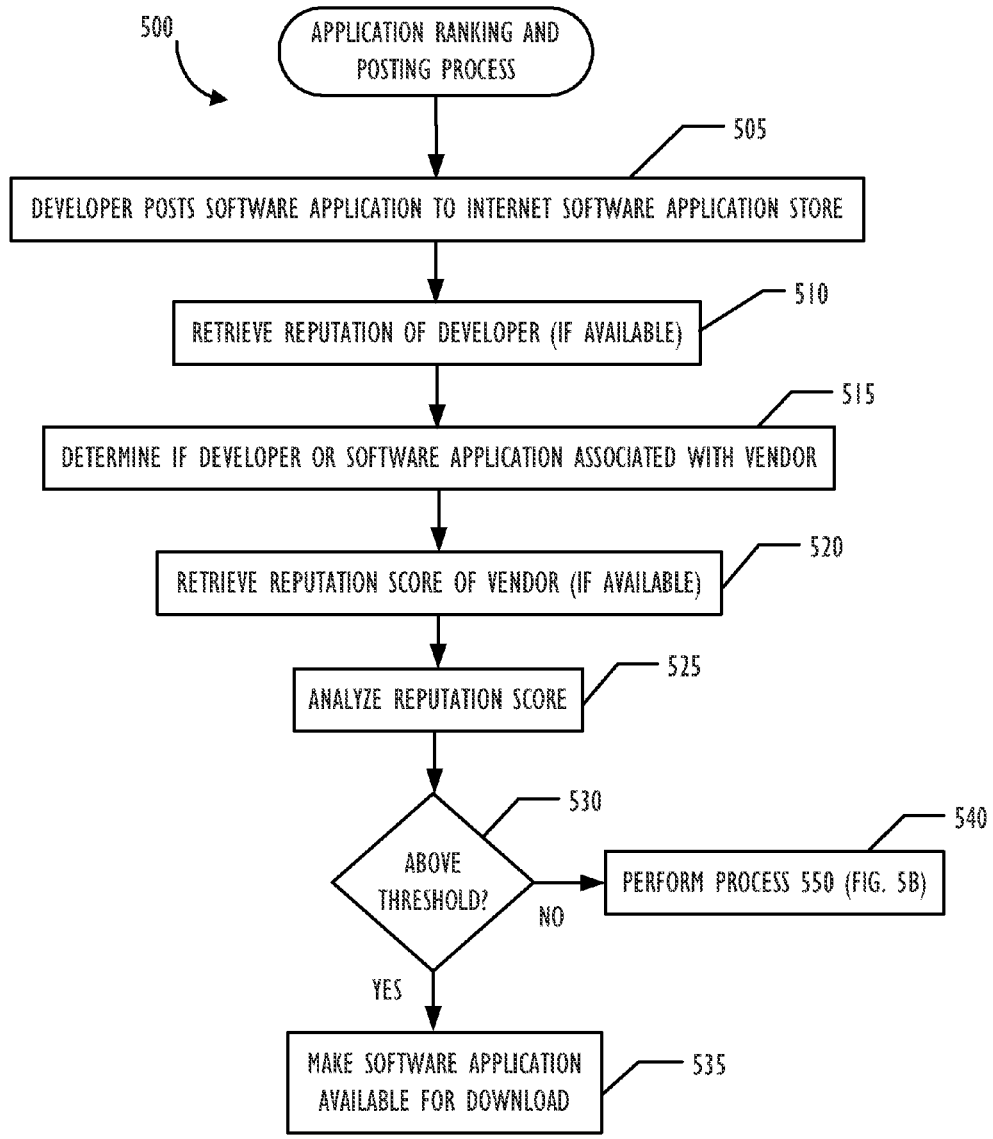
FIG. 5A is a flowchart illustrating a process for determining a ranking for a software application using one or more reputation scores augmented with code analysis results according to one embodiment.
Figure 5B:
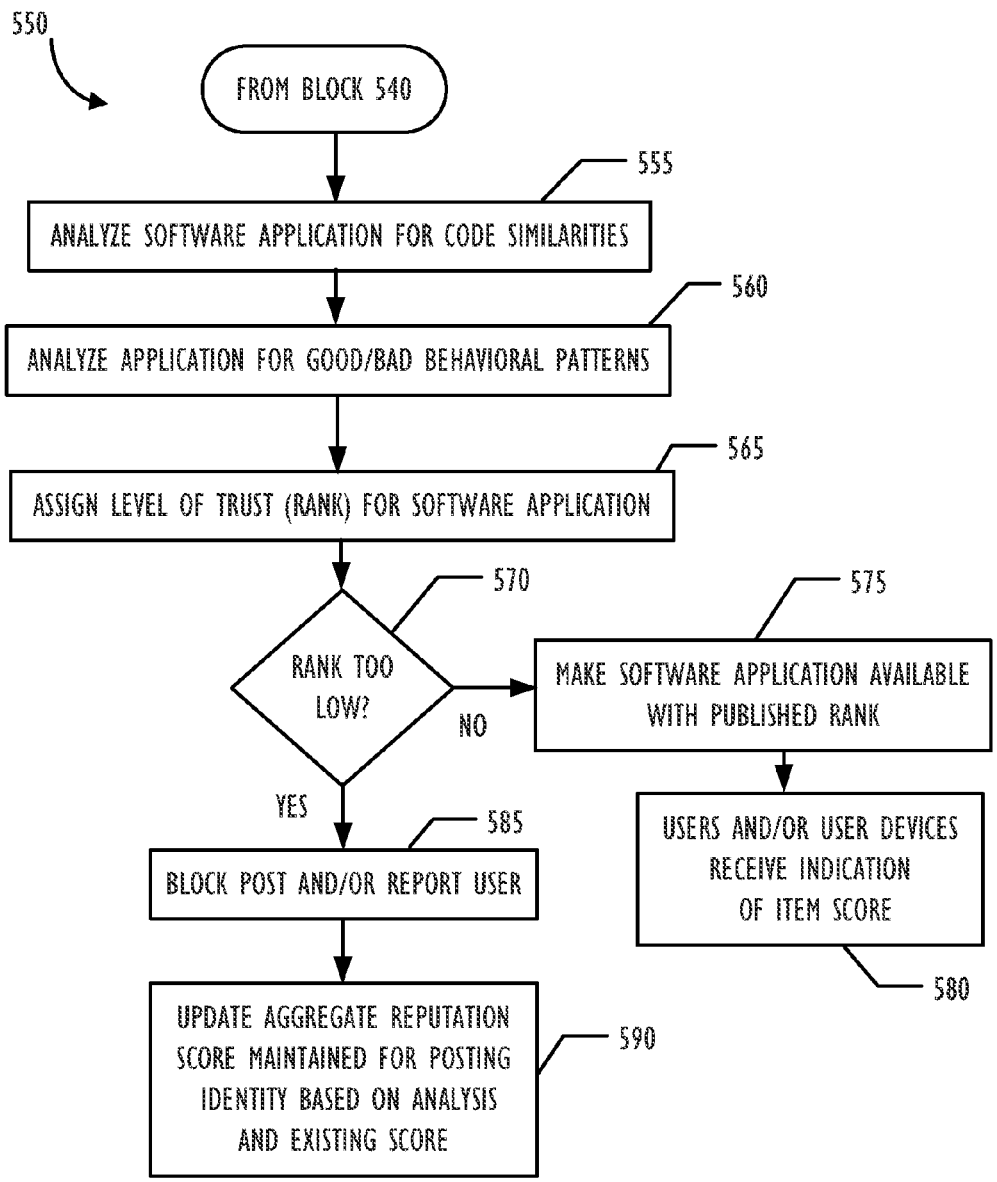
FIG. 5B is a flowchart illustrating a process for performing code ranking when a reputation score is below a threshold according to one disclosed embodiment.
Figure 6:
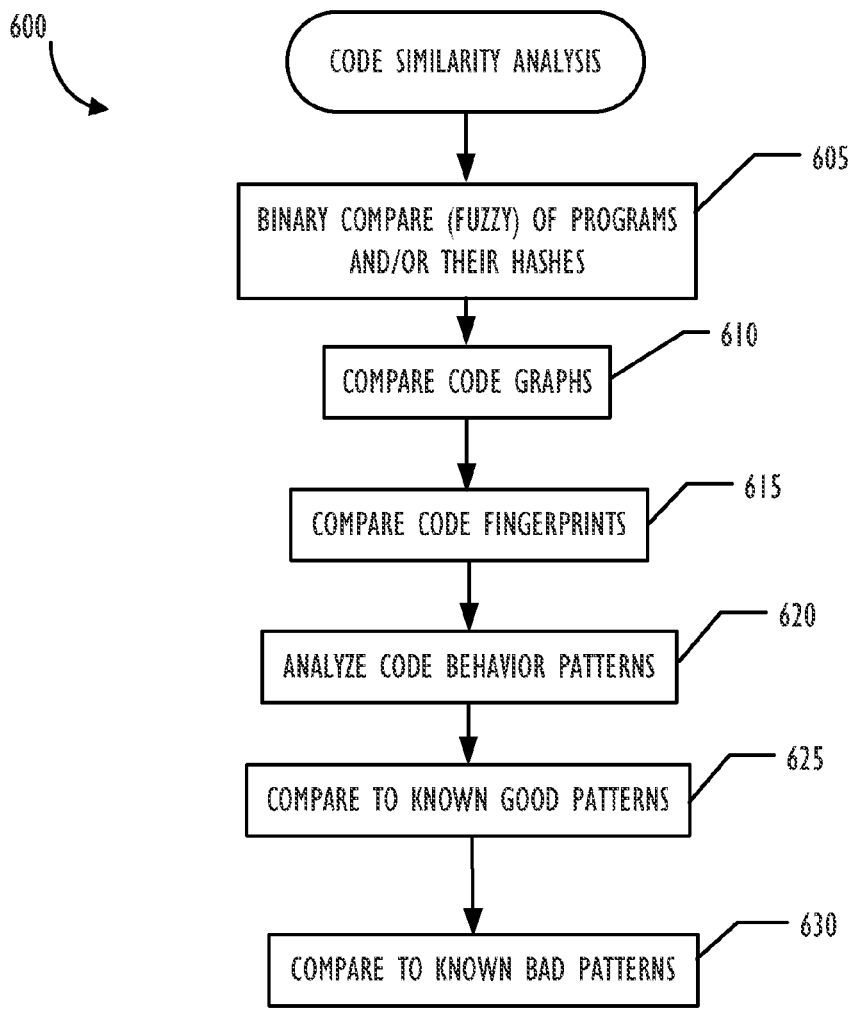
FIG. 6 is a flowchart illustrating a code analysis process and different code analysis techniques according to disclosed embodiments.

System unit 210 may be programmed to perform methods in accordance with this disclosure (examples of which are in FIGS. 5A-B and 6). System unit 210 comprises a processor unit (PU) 220, input-output (I/O) interface 250 and memory 230. Processing unit 220 may include any programmable controller device including, for example, a mainframe processor, or one or more members of the Intel Atom®, Core®, Pentium® and Celeron® processor families from Intel Corporation and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company). Memory 230 may include one or more memory modules and comprise random access memory (RAM), read only memory (ROM), programmable read only memory (PROM), programmable read-write memory, and solid-state memory. PU 220 may also include some internal memory including, for example, cache memory.

Processing device 200 may have resident thereon any desired operating system. Embodiments may be implemented using any desired programming language, and may be implemented as one or more executable programs, which may link to external libraries of executable routines that may be supplied by the provider of the application ranking software, the provider of the operating system, or any other desired provider of suitable library routines. As used herein, the term "a computer system" can refer to a single computer or a plurality of computers working together to perform the function described as being performed on or by a computer system.

In preparation for performing disclosed embodiments on processing device 200, program instructions to configure processing device 200 to perform disclosed embodiments may be provided stored on any type of non-transitory computer-readable media, or may be downloaded from a server 104 onto program storage device 280.

Figure 3:
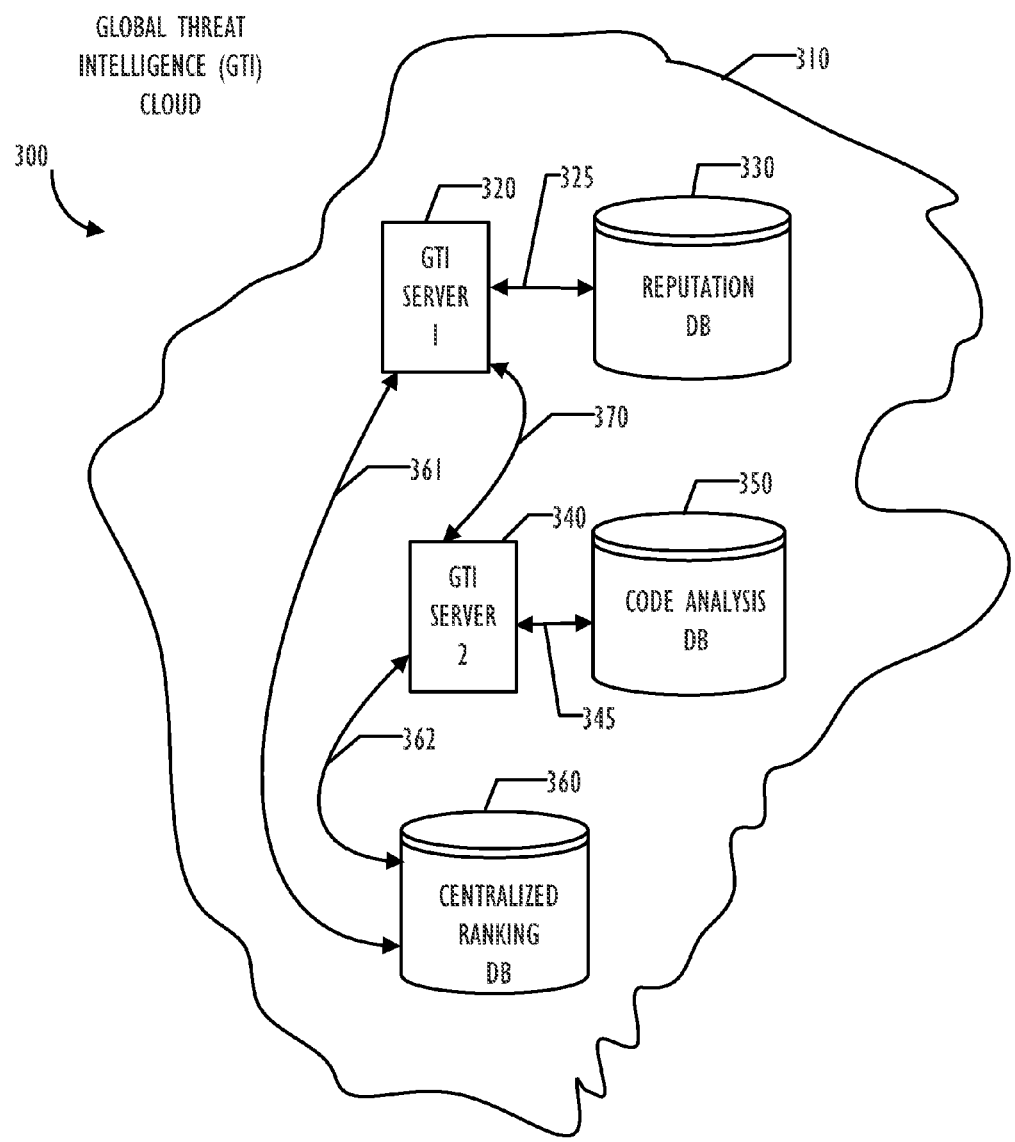
FIG. 3 is a block diagram of a Global Threat Intelligence (GTI) cloud configured to perform a software application ranking according to one embodiment.

Referring now to FIG. 3, block diagram 300 illustrates one example of a GTI cloud 310. A GTI cloud 310 can provide a centralized function for a plurality of clients (sometimes called subscribers) without requiring clients of the cloud to understand the complexities of cloud resources or provide support for cloud resources. Internal to GTI cloud 310, there are typically a plurality of servers (e.g., Server 1 320 and Server 2 340). Each of the servers is, in turn, typically connected to a data store (e.g., Reputation database (DB) 330 and Code Analysis DB 350) and possibly a centralized data store, such as Centralized Ranking DB 360. Each communication path is typically a network or direct connection as represented by communication paths 361, 362 and 370. Although diagram 300 illustrates two servers and a single centralized ranking DB 360, a comparable implementation may take the form of numerous servers with or without individual databases, a hierarchy of databases forming a logical centralized ranking DB 360, code analysis DB 350, reputation DB 330, or a combination thereof. Furthermore, a plurality of communication paths and types of communication paths (e.g., wired network, wireless network, direct cable, switched cable, etc.) may exist between each component in GTI cloud 310. Such variations are known to those of skill in the art and, therefore, are not discussed further here. Also, although disclosed herein as a cloud resource, the disclosed GTI cloud functions may be performed, in alternate embodiments, by conventionally configured (i.e., not cloud configured) resources internal to an organization.

To facilitate ranking of software applications in an Internet-based software application store, GTI cloud 310 can include information and algorithms to map a posting entity (e.g., person uploading information) back to a real world entity. For example, a user's profile could be accessed to determine a user's actual name rather than their login name or to determine a company affiliation for the user. Also, GTI cloud 310 can include information about accounts to assist in determining a reputation score. For example, a user account existing for less than 7 days with no company affiliation may have an average reputation. A different 7 day old account with affiliation to a reputable software corporation may have an above-average reputation. And, a two-year old account with no company affiliation but a history of reliable software application posts could have an above-average reputation. Obviously, a user account with frequent posts of software applications with malicious content may either be blocked entirely or have a very low reputation.

GTI cloud 310 can also contain one or more repositories about software application analysis to be used in the comprehensive ranking of software applications. For example, code analysis DB 350 can contain fingerprint data for known bad software applications, Application Program Interface (API) patterns for good and bad software applications, complete or partial code graphs corresponding to known applications, and possibly example applications themselves, among other things. For example, code graphs can include code dependency graphs that illustrate a graphical view of function calls from a program to subroutines and down to system calls. Also code graphs can define callers/callees to particular code elements (a caller/callee graph); or even coupling graphs that show couplings between 2 components, 2 namespaces or 2 data types, in addition to numerous other techniques to "graph" attributes of an applications code. Having these types of information available allow for implementation of known and possibly future methods of performing code similarity analysis according to the disclosed embodiments.

Figure 4:
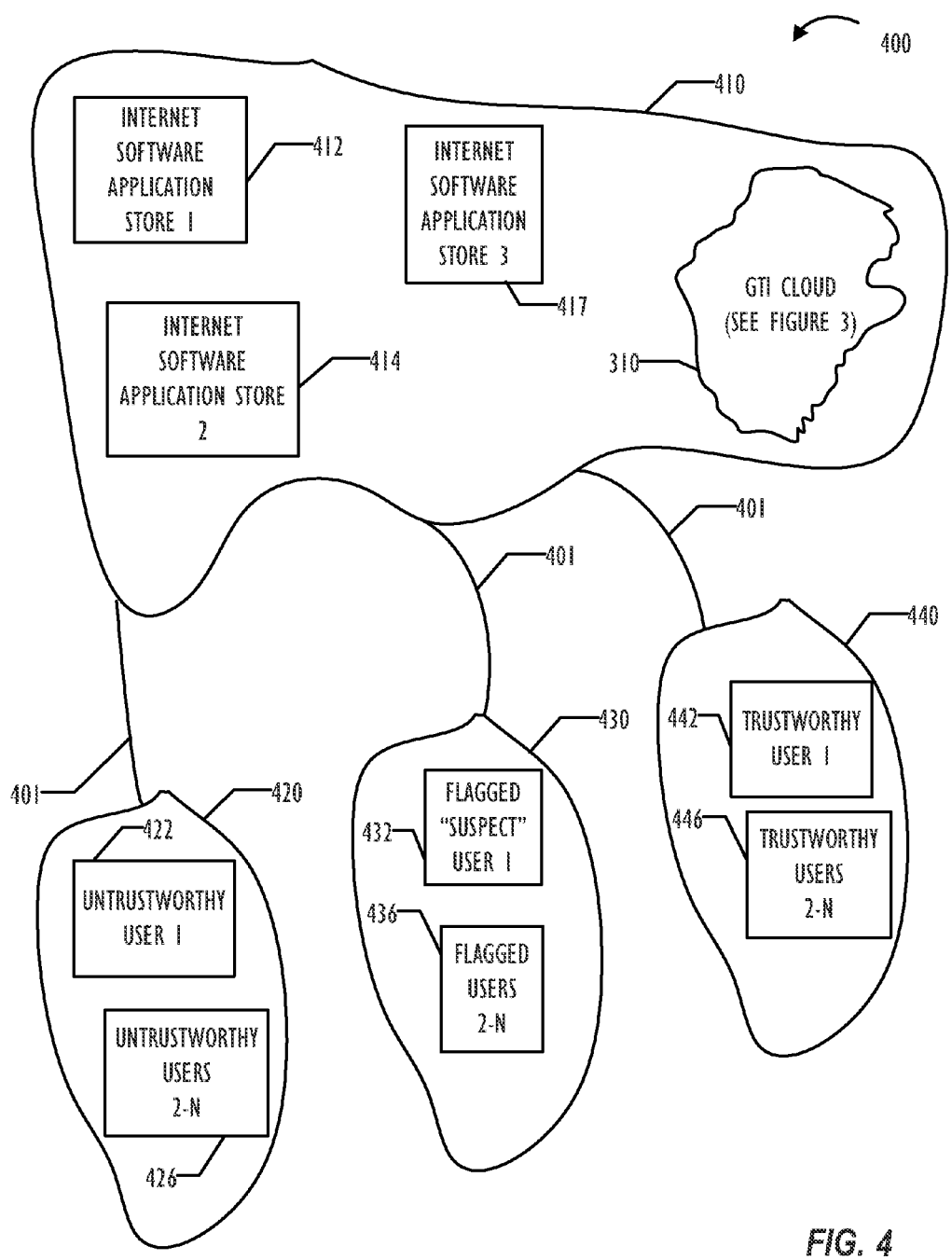
FIG. 4 is a block diagram of a representation of the Internet, software application stores, users (e.g., purchasers), and vendors/publishers to illustrate one embodiment.

Referring now to FIG. 4, block diagram 400 illustrates a plurality of user types (420, 430 and 440) connected by connection links 401 to Internet 410 and to each other (via Internet 410). User types 420, 430 and 440 represent (for the purposes of this example) three distinct sets of users based on their historical reputation (e.g., untrustworthy 420, flagged 430 and trustworthy 440). Each group may contain a plurality of users. Although shown as three classification levels, users could be grouped into any number of categories with different levels of reliability as appropriate. Not shown are users with an unknown reputation. Depending on implementation specifics, a user with no computed reputation can be defaulted into any of the three categories shown or given another category altogether. In one embodiment, when a user with an unknown reputation provides a software application to an Internet Software Application Store (412, 414 or 417), the initial ranking of the software may be heavily influenced by code similarity analysis performed on the provided software application. A flagged user (e.g., 432 and 436), in this example, is neither trustworthy nor untrustworthy but could have an unknown reputation or be in transition between classifications based on recent activity. User group 440 includes a plurality of users that have been classified as "trustworthy" (e.g., 442 and 446) and are generally considered reliable.

Internet 410 illustrates a greatly simplified view of the actual Internet. Internet 410 includes a plurality of Internet software application stores (412, 414 and 417), and a representation of GTI cloud 310 from FIG. 3. As is known to those of ordinary skill in the art, there could be any number of Internet software application stores. Some of the Internet software applications stores may be public forums with no corporate affiliation of any kind while others could be tightly coupled to a particular software vendor or software operating environment. In cases where there is a strong affiliation, it is possible that software applications can be "certified" according to an available certification criterion. In the disclosed embodiments, if a software application is previously certified the process of ranking of the software application can take the certification into account and presumably increase a ranking score (i.e., increase trust) for that certified software application. Additionally, once it is determined that a particular software application is certified it may not be necessary to perform further code analysis on the certified software application prior to making it available for download. Certification processes are generally known in the art of software development and are therefore not discussed further here.

Referring now to FIGS. 5A-B, processes 500 and its continuation process 550 illustrate an example process flow for an Internet-based software application store to post a new software application from a developer and provide a ranking of the application according to disclosed embodiments. Processes 500 and 550 could be performed in the context of an embodiment of GTI cloud 310 (FIG. 3) which in turn could comprise a portion of network architecture 100 (FIG. 1). The steps of processes 500 and 550 may not all be performed in every embodiment and may be performed in an order different than illustrated as required by different implementations of the disclosed embodiments. The order of process steps is typically based on design goals of a particular implementation.

Process 500, illustrated in FIG. 5A, shows a process for software application ranking and posting to an Internet software application store (e.g., 412, 414 and 417). Beginning at block 505, a software application developer (e.g., user) posts a software application. The "post" in this case is typically performed by a user who presumably developed the software application. The post would typically include uploading the software application to a server that is associated with an Internet software application store. Next, at block 510, a reputation of the application developer can be obtained from a Reputation Server (RS) providing a reputation service (e.g., from GTI cloud 310). At block 515 it can be determined if the developer is associated with a recognized vendor of software applications. As explained above, the association with a recognized vendor could influence a particular application's ranking. The user could be associated with a vendor because they are an authorized publisher for applications from that vendor (e.g., authorized employee). Alternatively, the software application itself could be associated with a vendor via, for example, a completed certification of that vendor's certification process or perhaps by using a digital signature of the vendor or the software application to associate a particular application with a vendor. If associated with a vendor, a reputation score of the vendor can be retrieved at block 520. Analysis of the retrieved reputation score(s) may be performed at block 525. At decision 530, it can be determined if the reputation alone is above a defined threshold. The threshold could be static or dynamic and vary over time based on one or more factors. The "threshold" could also be determined by checking an associated vendor with a pre-approved list of vendors (e.g., whitelist). If so (the YES prong of decision 530), flow can continue directly to block 535 where the uploaded software application is made available for download on the Internet software application store. However, if the reputation score is below the threshold (the NO prong of decision 530) flow can continue to block 540 to perform further processing.

Turning now to FIG. 5B, process 550 is a continuation of process 500 block 540. When it has been determined that further processing is required prior to making an uploaded software application available, code analysis (e.g., code similarity analysis) can be used to augment a reputation score and provide a more comprehensive software application ranking. At block 555 the uploaded software can be analyzed for code similarity to known good programs and/or known bad programs. In one embodiment, the data for comparison can be retrieved from a database such as code analysis DB 350. At block 560 the uploaded software application can also be analyzed for either good or bad behavioral patterns. Good or bad behavioral patterns can be determined, for example, by the types of system or application program interface (API) calls that an application includes or by the frequency and order of such calls. At block 565 the results of code analysis and reputation can be combined to determine a software rank (e.g., level of trust) for the uploaded software application. At decision 570 it can be determined if the rank is too low for publishing. If the determined ranking is high enough (the NO prong of decision 570), flow can continue to block 575 where the software application can be made available for download to, for example, third party users. An Internet software application store can also optionally display the determined rank to inform potential downloaders/purchasers prior to their decision to download and/or purchase a software application (block 580). End user devices may also have access to the determined rank and system administrators may set ranking attributes on devices to prevent certain devices from receiving software applications based on a particular application's rank. If the rank of the software application is too low (the YES prong of decision 570), flow can continue to block 585 where the software application is prevented from being made available and the uploading user may be reported back to an associated vendor and/or to the reputation server.

Finally, at block 590, the reputation score associated with the vendor/user may be affected by the blocked post.

One of ordinary skill in the art, given the benefit of this disclosure, will recognize that analysis performed in accordance with blocks 550 and 560 can be performed serially or in parallel. Also, other types of code analysis (not shown) can be performed in addition to or instead of code similarity or behavioral pattern analysis. Any number of analysis types could be performed and results of code analysis combined with reputation to produce a software ranking as described herein. Furthermore, the act of combining the analysis factors and reputation may be weighted more or less to analysis versus reputation as desired for a particular Internet software application store. Additionally, when vendors are notified of blocked posts they can perform additional steps to confirm the software is acceptable or to determine why the analysis indicated such a low rank. Information from a vendor analysis can be used to update the ranking system (e.g., via updates to code analysis DB 350) to improve future ranking functions.

Referring now to FIG. 6, process 600 illustrates possible code analysis techniques that could be used in one or more of the disclosed embodiments. Beginning at block 605 a binary compare of a program or hashes of programs can be performed. The comparison could be "fuzzy" to allow for small differences to not cause the comparison to fail. A hash of the entire program or selected portions of programs can be used to determine similarity between the program being analyzed and other known programs. At block 610 code graphs of different programs could be compared. A code graph can show calling patterns of programs to detect anomalies of program execution or code injection attacks among other things. At block 615 code fingerprints can be generated and compared. Code fingerprints are similar to hashes and binary compares and can be used to identify particular applications or portions of software applications. At block 620 code behavior patterns can be determined and compared to known good behavior patterns (block 625) or bad behavior patterns (block 630) of other code samples. Each of these techniques and others known in the art can be used to assist in ranking of software applications according to the disclosed embodiments. Even though the steps of FIG. 6 indicate a series of sequential analysis processes this is not intended to indicate that acts of analysis need to be performed in a particular order. Furthermore, the act of "code analysis" may involve any one or more of these approaches and, when more than one is employed; the results of the different types of analysis may be combined with different weighting factors for the different types of analysis. The process of combining the different measures may be made in any desired manner. For example, the linear or non-linear combination of disclosed factors (reputation and code analysis) could be used.

As should be apparent from the above explanation, embodiments disclosed herein allow the user, the reputation services server, web sites and end-users to work together to create and determine (in an on-going manner) a reputation for a developer posting applications to Internet software application stores. Also, in the embodiments specifically disclosed herein, the reputation can be used in conjunction with code similarity and other code analysis techniques to determine a ranking for a given new software application. Although described above in the context of an Internet application store, concepts of this disclosure can also be applied to a peer-to-peer exchange of software. A ranking of software using both reputation and code analysis techniques could prevent users of peer-to-peer sharing systems from downloading/sharing software applications that have a low rank.

As used herein, software ranking score, content score, or reputation score is not intended to be limited to a numeric score but rather a measure of each respective component input. For consistency the term "score" has been used throughout this disclosure and claims and should be thought of as interchangeable with the term "measure." For example, a software ranking could be a rank/level result of analysis of the software application (e.g., blocks 555 and 560) with the result being used against a lookup table to determine what is allowed or not for a particular vendor or downloader. In addition, alternative methods are envisioned to arrive at the yes/no decision of block 570 as determined from all data obtained from analysis. In addition methods to identify software ranking to potential downloaders are not limited to a numerical indication of score. Icons or other graphical indicators (including color codes) may be associated with the software application to alert potential downloaders of the corresponding software application's rank. In summary, a software application's ranking score may be thought of as a "measure" of the trustworthiness of the software taking into consideration many different possibilities of reputation and code analysis factors.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A non-transitory computer readable medium with instructions stored thereon, comprising instructions that when executed cause a processor to:
receive uploaded content comprising an uploaded software application into an internet application store;

obtain an indication of a creator of the uploaded software application;

determine a content score, based at least in part, on analysis of a portion of the uploaded content based at least in part on a comparison of the uploaded content against known malware;

obtain a reputation score associated with the indicated creator, wherein the reputation score is determined based on characteristics of an account for the indicated creator;

calculate a ranking score for the software application based, at least in part, on the reputation score and the content score; and determine whether to publish the uploaded software application in the internet application store, comprising instructions that when executed cause the processor to:

publish the uploaded software application responsive to a first relationship between the ranking score and a ranking threshold; and prevent publication of the uploaded software application responsive to a second relationship between the ranking score and the ranking threshold, wherein the uploaded software application is inaccessible for receiving download requests in the internet application store prior to determining whether to publish.

2. The non-transitory computer readable medium of claim 1, wherein the instructions that when executed cause the processor to obtain a reputation score comprise instructions that when executed cause the processor to obtain a default value for the reputation score if no reputation score is available for the indicated creator.

3. The non-transitory computer readable medium of claim 1 wherein the instructions that when executed cause the processor to analyze the portion of the uploaded content comprise instructions that when executed cause the processor to perform a code similarity analysis.

4. The non-transitory computer readable medium of claim 1 wherein the instructions that when executed cause the processor to calculate a ranking score comprise instructions that when executed cause the processor to assign more weight to the reputation score than the content score.

5. The non-transitory computer readable medium of claim 1, wherein the instructions that when executed cause the processor to obtain a reputation score comprise instructions that when executed cause the processor to obtain a default value for the content score instead of analyzing the uploaded content if the uploaded software application is indicated to be certified against a vendor certification procedure.

6. The non-transitory computer readable medium of claim 1 wherein the instructions that when executed cause the processor to obtain an indication of a creator for the uploaded software application comprise instructions that when executed cause the processor to obtain an indication of a creator that is selected from the group consisting of an individual software developer and a software vendor.

7. The non-transitory computer readable medium of claim 1 further comprising instructions that when executed cause the processor to provide a software application ranking indication when making the uploaded software application available for download.

8. A computer system, the computer system comprising:
a processor;
a network interface communicatively coupled to the processor; and
a storage device communicatively coupled to the processor, wherein the processor is configured with computer instructions that when executed cause the processor to:

obtain an uploaded software application by an Internet software application store;

determine an identity associated with a creator of the uploaded software application;

obtain a reputation score for the identity, wherein the reputation score is determined based on characteristics of an account for the indicated creator, wherein the characteristics comprise an indication of a frequency of posting software applications containing malware;

analyze the reputation score relative to a defined threshold; and determine whether to publish the uploaded software application in the Internet software application store, comprising instructions that when executed cause the processor to:

publish the uploaded software application responsive to a first relationship between the reputation score and the defined threshold; and prevent publication of the uploaded software application responsive to a second relationship between the reputation score and the defined threshold, wherein the uploaded software application is inaccessible for receiving download requests in the internet application store prior to determining whether to publish.

9. The computer system of claim 8 wherein the processor is further configured with computer instructions that when executed cause the processor to:

analyze the uploaded software application for code similarity to one or more other known computer applications;

determine a ranking for the uploaded software application based, at least in part, on the reputation score and a result of the code similarity analysis;

publish the uploaded software application responsive to a first relationship between the ranking and a ranking threshold; and prevent publication of the uploaded software application responsive to a second relationship between the ranking and the ranking threshold.

10. The computer system of claim 9 wherein the processor is further configured with computer instructions that when executed cause the processor to notify a vendor associated with the creator of the uploaded software application if the ranking has the second relationship to the ranking threshold.

11. The computer system of claim 9 wherein the processor is further configured with computer instructions that when executed cause the processor to remove the uploaded software application from availability for download if the ranking is lowered after the uploaded software application had been made available for download.

12. The computer system of claim 9 wherein the processor is further configured with computer instructions that when executed cause the processor to provide a graphical indication of the ranking of the uploaded software application.

13. A computer system, the computer system comprising:
a processor;
a network interface communicatively coupled to the processor; and
a storage device communicatively coupled to the processor having stored therein instructions that when executed cause the processor to:

receive, by an Internet software application store, a software application and a request to publish the received software application; and prevent publication in the Internet software application store of the software application based on a ranking of the software application, wherein the ranking is based, at least in part, on one or more reputation scores and one or more code analysis factors of the software application, wherein the one or more reputation scores are determined based on characteristics of an account for the indicated creator;

wherein the one or more code analysis factors are based in part on a comparison of the software application against known malware;

wherein publication is prevented for the software application when the ranking of the software application is determined to not pass a ranking threshold, and wherein the received software application is inaccessible for receiving download requests in the Internet software application store prior to publication.

14. A non-transitory computer readable medium comprising computer executable instructions stored thereon that when executed cause a processor to:

receive a software application and a request to publish the software application in an Internet software application store;

publish the software application responsive to a first relationship between a ranking of the software application and a ranking threshold; and prevent publication of the software application responsive to a second relationship between the ranking and the ranking threshold, wherein the ranking is based, at least in part, on one or more reputation scores and one or more code analysis factors of the software application, wherein the reputation score is determined based on characteristics of an account for the indicated creator, wherein the one or more code analysis factors are based in part on a comparison of the software application against known malware; and wherein the software application is inaccessible for receiving download requests in the Internet software application store prior to publication.

15. A method of determining a software ranking of a software application utilizing one or more processors, the method comprising:

receiving, by an Internet application store, uploaded content comprising an uploaded software application;

obtaining an indication of a creator of the uploaded software application;

analyzing, on one or more processors, a portion of the uploaded content to determine a content score for the uploaded software application, wherein the content score is based at least in part on a comparison of the uploaded software application and known malware;

obtaining a reputation score associated with the indicated creator, wherein the reputation score is determined based on characteristics of an account for the indicated creator;

calculating a ranking score for the uploaded software application based, at least in part, on the reputation score and the content score;

publishing the uploaded software application responsive to a first relationship between the ranking score and a ranking threshold; and preventing publication of the uploaded software application responsive to a second relationship between the ranking score and the ranking threshold, wherein the uploaded software application is inaccessible for receiving download requests in the Internet application store prior to publication.

16. The method of claim 15 wherein the act of obtaining a reputation score comprises using a default value for the reputation score if no reputation score is available for the indicated creator.

17. The method of claim 15 wherein the act of analyzing a portion of the uploaded content comprises performing a code similarity analysis.

18. The method of claim 15 wherein the act of calculating a ranking score comprises assigning a higher importance to the reputation score than the content score.

19. The method of claim 15 wherein the act of obtaining a reputation score comprises obtaining a default value for the content score instead of analyzing a portion of the uploaded content if the uploaded software application is indicated to be certified against a vendor certification procedure.

* * * * *